United States Patent
Bleier et al.

[19]

[11] Patent Number: 6,141,101

[45] Date of Patent: *Oct. 31, 2000

[54] MONOLITHIC OPTICAL ASSEMBLY

[75] Inventors: Zvi Bleier, Commack; Itai Vishnia, Wantagh, both of N.Y.

[73] Assignee: PLX, Inc., Deer Park, N.Y.

[*] Notice: This patent is subject to a terminal disclaimer.

[21] Appl. No.: 09/298,871

[22] Filed: Apr. 26, 1999

Related U.S. Application Data

[63] Continuation-in-part of application No. 08/967,624, Nov. 12, 1997, Pat. No. 5,949,543.

[51] Int. Cl.[7] .................................. G01B 9/02; G01J 3/45
[52] U.S. Cl. ......................... 356/346; 356/345; 356/451
[58] Field of Search ..................................... 356/346, 345, 356/358, 363, 244

[56] References Cited

U.S. PATENT DOCUMENTS

| | | | |
|---|---|---|---|
| 4,657,390 | 4/1987 | Doyle | 356/346 |
| 4,684,255 | 8/1987 | Ford . | |
| 4,693,603 | 9/1987 | Auth . | |
| 4,726,657 | 2/1988 | Perkins et al. . | |
| 4,773,757 | 9/1988 | Doyle . | |
| 4,784,488 | 11/1988 | Doyle et al. . | |
| 4,810,092 | 3/1989 | Auth . | |
| 4,991,961 | 2/1991 | Strait . | |
| 5,066,990 | 11/1991 | Rippel . | |
| 5,153,675 | 10/1992 | Beauchaine . | |
| 5,313,269 | 5/1994 | Ponce et al. . | |
| 5,486,917 | 1/1996 | Carangelo et al. . | |
| 5,537,208 | 7/1996 | Bertram et al. . | |
| 5,541,728 | 7/1996 | Dierking . | |
| 5,675,412 | 10/1997 | Solomon | 356/345 |
| 5,949,543 | 9/1999 | Bleier et al. | 356/346 |

FOREIGN PATENT DOCUMENTS

| | | |
|---|---|---|
| 63-241435 | 10/1988 | Japan . |
| 4-142430 | 5/1992 | Japan . |
| WO 87/05100 | 8/1987 | WIPO . |

*Primary Examiner*—Robert H. Kim
*Assistant Examiner*—Philip Natividad
*Attorney, Agent, or Firm*—Michael R. Gilman; Kaplan & Gilman, LLP

[57] ABSTRACT

In accordance with the invention, an improved optical assembly having a monolithic structure is provided. The monolithic optical assembly is useful in interferometers to achieve a fringe effect in a Fourier transform spectrometer, and comprises top and bottom members which are joined into a monolithic structure by first and second support members and a beamsplitter. The assembly also comprising a first reflecting assembly in reflecting relation with the beamsplitter. An alternate embodiment of the invention has an added reflecting assembly in reflecting relation with the first reflecting assembly and the beamsplitter assembly, which allows for the use of multiple wavelength light sources to achieve a fringe effect in a Fourier transform spectrometer.

17 Claims, 11 Drawing Sheets

MONOLITHIC OPTICAL ASSEMBLY

This application is a continuation-in-part of application Ser. No. 08/967,624, filed Nov. 12, 1997, U.S. Pat. No. 5,949,543.

BACKGROUND OF THE INVENTION

This invention relates to the field of optical assemblies, and more particularly to a monolithic optical assembly for use in an interferometer.

Interferometers are old in the art, with Michelson interferometers having been first designed over 100 years ago.

An interferometer is an optical assembly used to measure radiation spectra, with the interferometer producing an interference pattern between two beams of light that traverse different paths. An interferometer divides a beam of radiation emanating from a radiation source through use of a beamsplitter inclined at a 45° angle to two reflecting assemblies whose optical paths are at 90 degrees to each other. One of the reflecting assemblies is fixed, while the other is movable along the radiation's path, so as to introduce the path difference, thereby creating the interference pattern which is read by a detector after the divided beam of radiation is recombined through reflection off of the two reflecting assemblies. The variation in the intensity of the beams passing to the detector is a function of the path difference, and ultimately yields the spectral information in a Fourier transform spectrometer.

In practice, interferometers are used for the above discussed spectrometry, and for accurate distance measuring and equipment calibrations.

The prior art optical assemblies used in the construction of standard Michelson interferometers, and other type interferometers, have consisted primarily of structures having parts which are in need of high accuracy alignment. For example, the arrangement of the two reflecting assemblies and the beamsplitter must be highly accurate in the perpendicular and 45 degree arrangements in order to avoid errors introduced due to any such misalignment. The trouble with these prior art interferometers and optical assemblies results from the cost involved in meticulously aligning the optical pieces, and the subsequent cost of maintaining the alignment of those pieces after shocks and vibrations cause them to be misaligned.

A further disadvantage in the prior art optical assemblies and interferometers results from the physical need of replacing beamsplitters with different beamsplitters depending upon the radiation source used in a particular measurement or experiment. Specifically, a typical beamsplitter is useful for only one particular wavelength spectrum section of a source of radiation, or alternatively, a very small range of radiation wavelength spectrum sections, and it is therefore necessary to have multiple interferometers, each having different beamsplitters, or to constantly need to replace a beamsplitter in a single interferometer, so that the interferometer can be used for other applications.

Yet another disadvantage of the prior art optical assemblies and interferometers, is that they are constructed to only allow for use with single wavelength light sources. Specifically, in order to yield the spectral information resulting from use of a Fourier transform spectrometer ("fringes"), a light beam of only one wavelength (such as, laser light) is required to be used in all prior art interferometer devises.

Accordingly, it would be desirable to provide an optical assembly, with and without a retroreflector/beamsplitter combination, that provides high accuracy measurements in a unit which is monolithic in construction, so that field calibrations and maintenance of the optical components of the assembly are not required after shocks, vibrations, or due to temperature changes.

It would also be desirable to provide an optical assembly which is monolithically constructed and which forms the major alignment components of an interferometer, so as to facilitate easy and cost effective maintenance and replacement of the optical assembly within a single interferometer for use with different intensity radiations, which optical assembly is not subject to misalignment from shocks, vibrations, or temperature changes due to the monolithic structure of the assembly. It would be further desirable to provide an optical assembly which allows for use of multiple wavelength light sources to achieve a "fringe" result in a spectrometry application.

SUMMARY OF THE INVENTION

In accordance with the invention, an improved optical assembly having a monolithic structure, and an improved optical assembly having a monolithic structure and a retroreflector/beamsplitter combination is provided. The monolithic optical assembly comprises top and bottom members which are joined into a monolithic structure by first and second support members and a beamsplitter. The assembly also comprising a first reflecting assembly in reflecting relation with the beamsplitter. An alternate embodiment of the invention substitutes the monolithic structure having the above six components, with a monolithically constructed hollow corner-cube retroreflector, wherein one of the retroreflector panels is a reflecting surface, another panel (situated at a 45 degree angle to the reflecting surface of the first panel) is a beamsplitter, and the third panel is a support panel used to complete the construction of the hollow corner-cube retroreflector.

In further accord with the invention, an improved optical assembly having a monolithic structure is provided. This monolithic optical assembly differs from the above assembly in that it has an added reflecting assembly in reflecting relation with the beamsplitter assembly which allows for the use of multiple wavelength light sources to achieve a fringe effect in a Fourier transform spectrometer.

Accordingly, it is an object of the invention to provide an improved optical assembly for use in a interferometer which is monolithically constructed.

Still another object of the invention is to provide an improved optical assembly which achieves high accuracy measurements and resists misalignment due to shock, vibrations, or temperature changes.

Yet another object of the invention is to provide an improved optical assembly which because of its monolithic construction is easily interchangeable with other such constructed optical assemblies for variation of beamsplitters in interferometers for use with different radiation sources.

A further object of the invention is to provide an improved optical assembly which functions as an interferometer to yield fringes on a spectrometer detector when a multiple wavelength light source is used.

Other objects of the invention will in part the obvious and will in part the apparent from the following description.

The invention accordingly comprises assemblies possessing the features, properties, and the relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
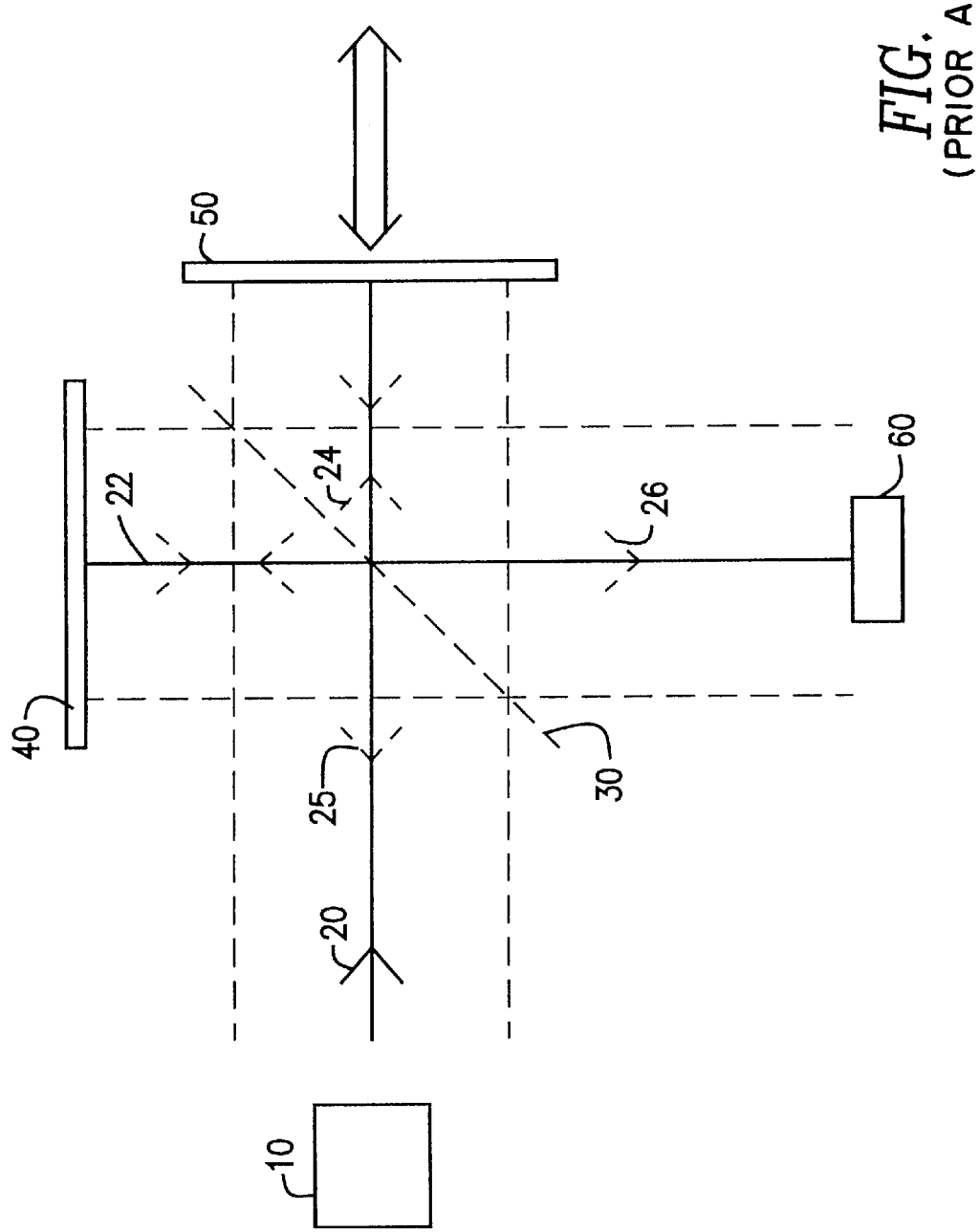
FIG. 1 is a diagram showing how radiation is reflected in a prior art Michelson interferometer.

Referring first to FIG. 1, a standard Michelson interferometer is shown. The Michelson interferometer has a radiation source 10 which sends a single radiation beam 20 towards beamsplitter 30 which is situated at a 45 degree angle to two mirrors, a fixed mirror 40 and a movable mirror 50. Radiation 20 is partially reflected toward fixed mirror 40 in the form of radiation beam 22, and is partially translated through beamsplitter 30 towards movable mirror 50 as radiation beam 24.

Beam 22 is then reflected off of fixed mirror 40, back towards beamsplitter 30, where it is once again partially split, sending some radiation 25 back towards source 10, and some radiation 26 toward detector 60. Similarly, beam 24 reflects off of movable mirror 50 and is reflected back toward beamsplitter 30. Here also, beam 24 is again split, sending some radiation back to source 10 and other radiation 26 toward detector 60.

Detector 60 measures the interference between the two radiation beams emanating from the single radiation source. These beams have, through translation and reflection, traveled different optical path lengths, which creates the fringe effect which is visible and measurable to detector 60.

Figure 2:
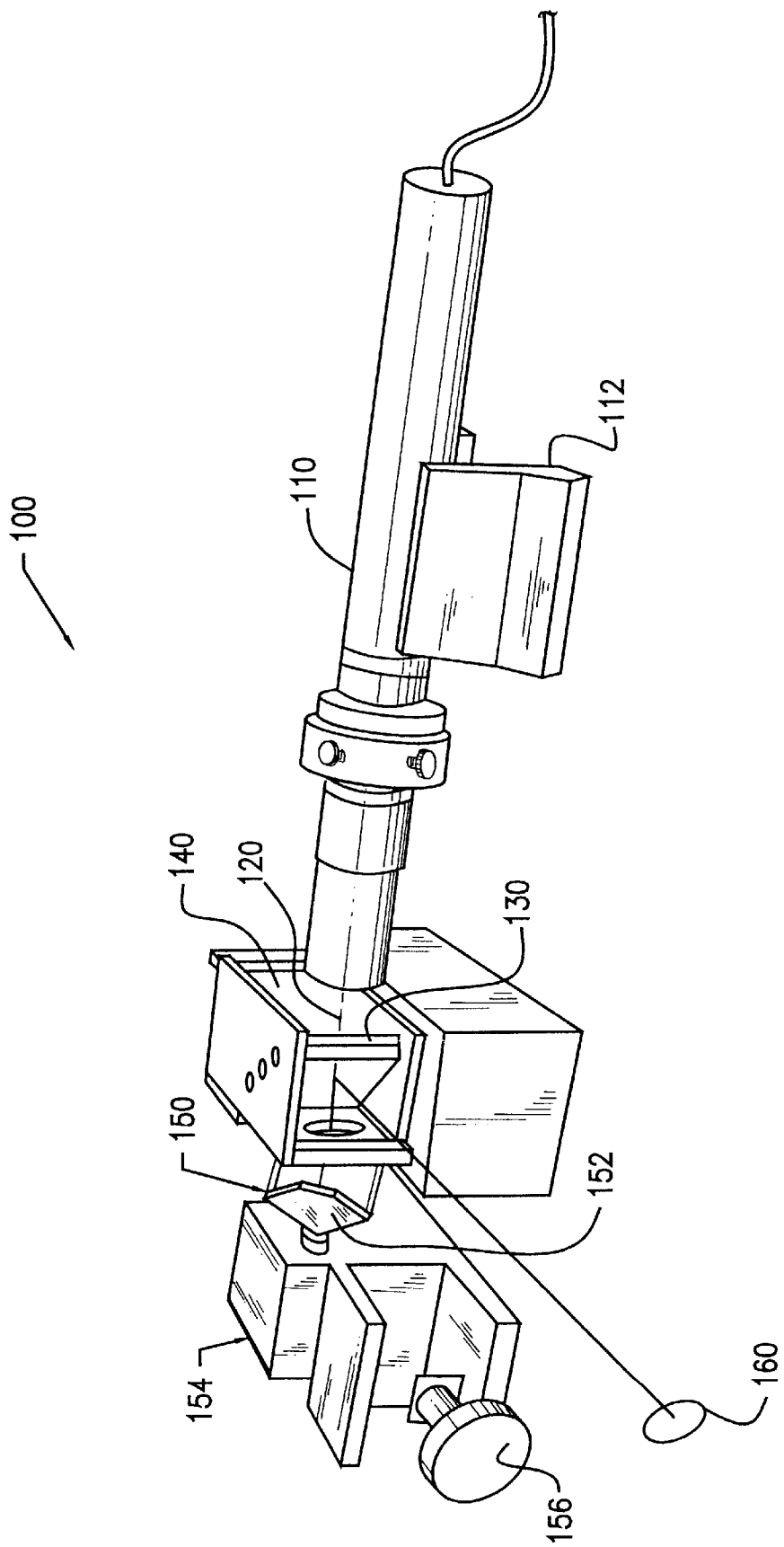
FIG. 2 is a perspective view of an interferometer having the monolithic optical assembly of the invention.

Directing attention now to FIG. 2, the standard lay out and component structure of a Michelson interferometer is shown at interferometer 100, and includes a radiation source 110, a beamsplitter 130, a movable reflecting assembly 150, a fixed reflecting assembly 140 and a detector 160.

Radiation source 110 is mounted in a secure position by mounting assembly 112. With radiation source 110 in mounting assembly 112, radiation beam 120 is alignable along a path which will fix the direction of the beam at a 45 degree angle to beamsplitter 130.

Radiation source 110 can be collimated white light for general interferometry applications, such as distance measurement calculation, or even a single collimated radiation intensity laser light source, and all of the items are anticipated by the invention.

Discussing now movable reflecting assembly 150, the preferred embodiment shows that instead of a single panel mirror, a hollow corner-cube retroreflector 152 is used. It is anticipated that the hollow corner-cube retroreflector would be made in its preferred embodiment as is dictated by the disclosure of U.S. Pat. No. 3,663,084 to Lipkins.

Retroreflector 152 is mounted to a movable base assembly 154, which assembly allows for adjustment of the location of retroreflector 152 in a line along the path of beam 120. The displacement of assembly 154 is adjustable through use of adjusting knob 156, but other means of moving assembly 154 are also anticipated by the invention, including such means that might allow for continuous, uniform movement of assembly 154. It is also possible that the manor of mounting retroreflector 152 to assembly 154 might be made in accordance with the structure described in U.S. Pat. No. 5,335,111, to Bleier.

The use of retroreflector 152 as movable reflecting assembly 150 allows for any orientation of retroreflector 152, as long as the reflecting surfaces of the retroreflector are at a 45 degree angle to the direction of incoming beam 120 after it passes through beamsplitter 130.

Figure 3:
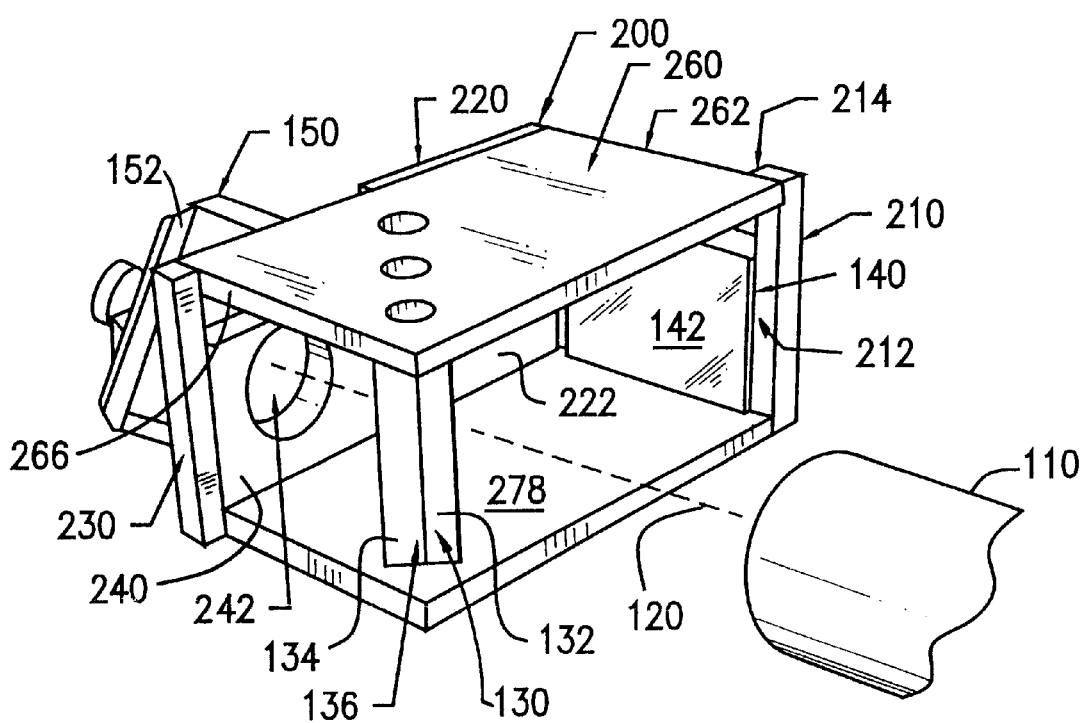
FIG. 3 is a perspective view of the monolithic optical assembly of the invention.
Figure 4:
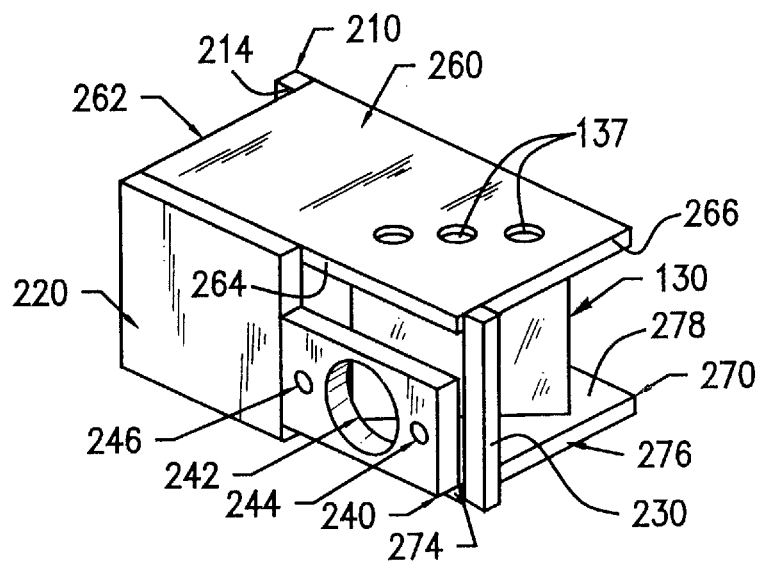
FIG. 4 is an alternate perspective view of a another side of the monolithic optical assembly of the invention.

Turning now to a more detailed discussion of monolithic optical assembly 200, as seen in FIGS. 2–4, it is seen that beamsplitter 130 and reflecting assembly 140 are mounted within monolithic optical assembly 200. As will be further discussed herein, and for further structural analysis of assembly 200, attention is also directed to FIGS. 5–7. The difference between the embodiments of FIGS. 2–4 and FIGS. 5–7, regards openings 244 and 246 (see FIGS. 5–7). These additional openings in support member 240, are associated with the use of a radiation source 110 which is a HeNe (helium neon) laser source for use in distance measurements. While the purpose of the second embodiment shown in FIGS. 5–7 will be discussed below, the overall structure of assembly 200 is otherwise identical with that of assembly 200 of FIGS. 2–4, and for purposes of describing that structure, FIGS. 2–7 will now be discussed.

As seen in FIG. 3, monolithic optical assembly 200 is comprised of a top member 260, a bottom member 270 and at least first and second support members 210 and 220, respectively, and beamsplitter 130. As an add on for some additional structural stability, which stability is not essential, third support member 230 can also be used.

As seen in the figures, support member 210 has a first edge surface 212 and a second edge surface 214. A portion of first edge 212 is bonded to a portion of a first edge 262 of top member 260 (see FIG. 4), while another portion of first edge 212 of support member 210 is bonded to a portion of a first edge surface of bottom member 270 (also see FIG. 4).

Continuing with FIG. 4, around the corner from support member 210, is second support member 220. Second support member 220 is bonded to top and bottom members 260 and 270 along different portions of a first surface 222 thereof. The portions of first surface 222 of support member 220 are bonded to portions of a second edge surface 264 of top member 260 and second edge surface 274 of bottom member 270.

Figure 7:
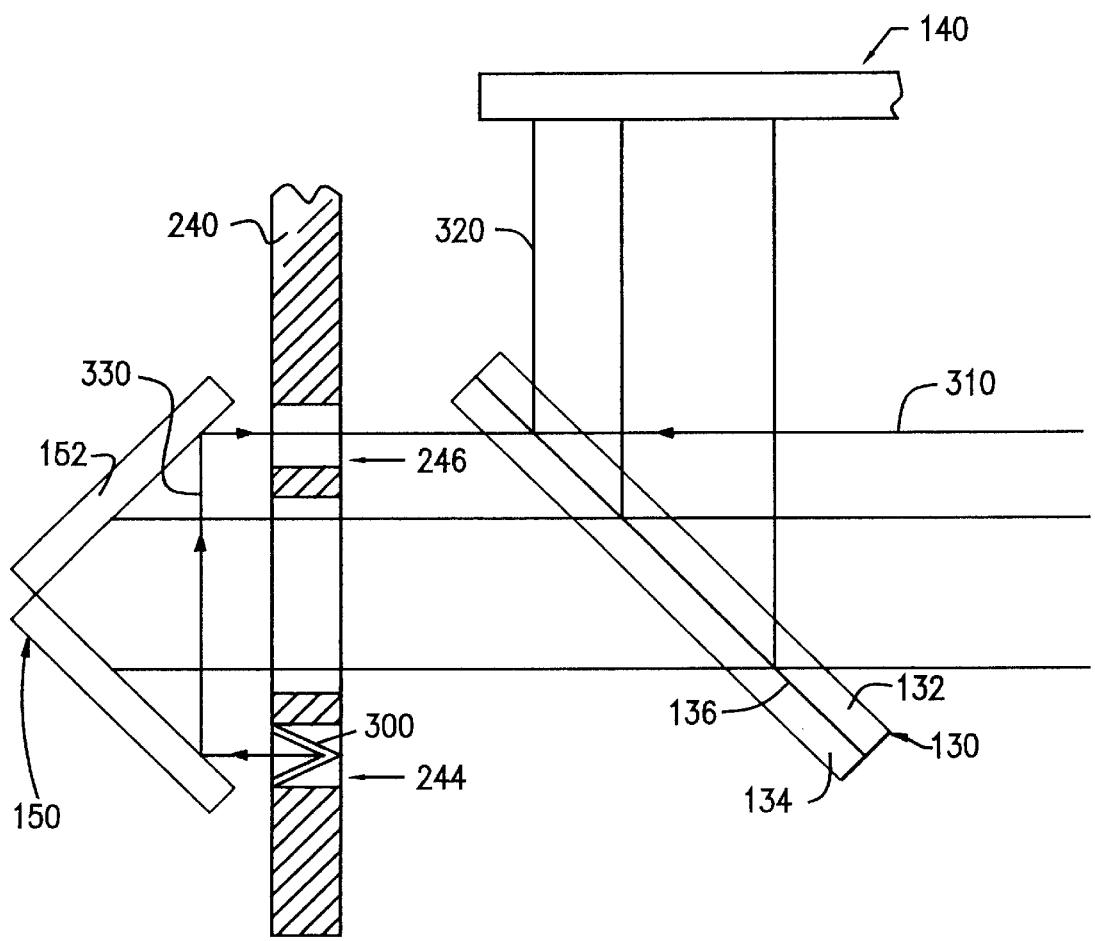
FIG. 7 is a partial top plan view of an alternate embodiment of the invention.

Beamsplitter 130, as seen in the figures and in particular in FIG. 7, is comprised of two panels 132 and 134, which panels are bonded to each other along a common surface 136. Surface 136 is an optically flat reflecting surface having a beamsplitter coating thereon. Beamsplitter 130 is bonded along portions of top edges 137 to portions of bottom surface 267 of top member 260, and along portions of bottom edges 138 to portions of top surface 278 of bottom member 270. However, as is customary when beamsplitters are used, a compensating member is also used. In this case, beamsplitter 130 has the compensating member built in; i.e., panel 132. The purpose of the compensating panel is to equate the optical path velocities of the two beams created by the beamsplitter coating. Without the compensating member, the beam translated through the beamsplitter would travel through panel 134 three times, while the reflected beam would travel only once through beamsplitter 130. By adding panel 132, both beams translate through equally sized panels four times each, thereby equating any differences they may have experienced in optical length.

Figure 9:
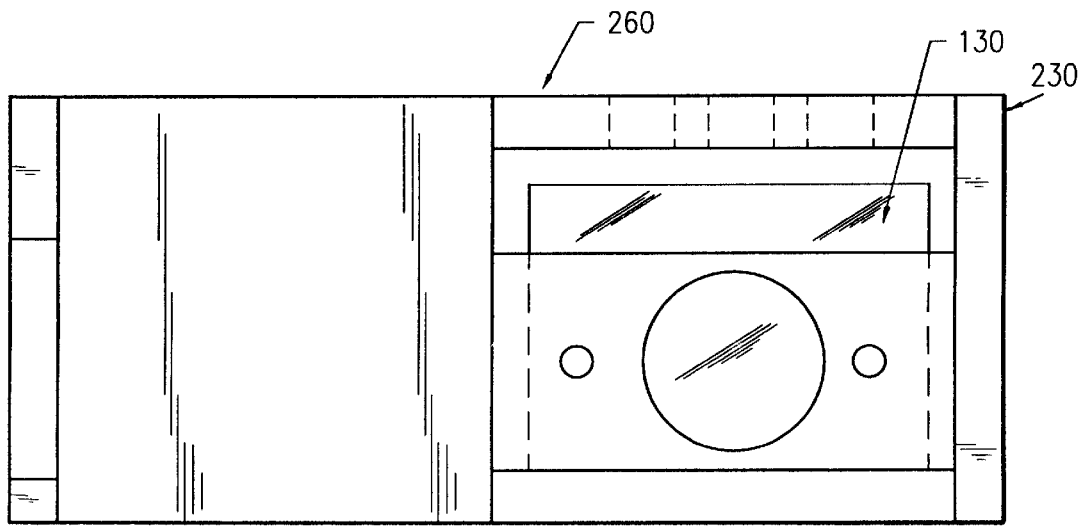
FIG. 9 is a side elevational view of another embodiment of the elevation of FIG. 6.
Figure 10:
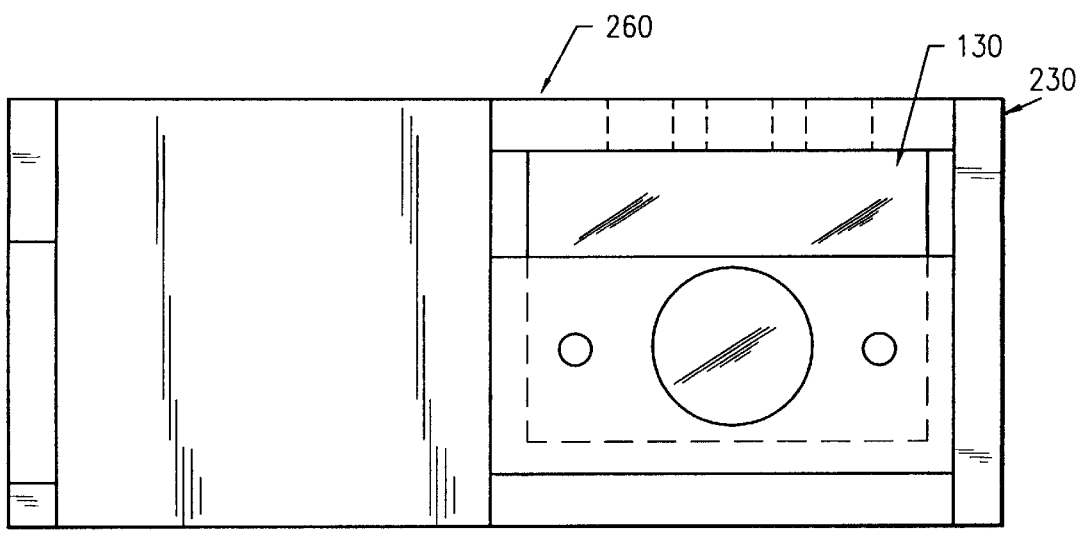
FIG. 10 is yet another side elevational view of another embodiment of the elevation of FIG. 6.

The support combination of first support member 210, second support member 220 and beamsplitter 130 between top member 260 and bottom member 270 is what creates the monolithic structure of the invention. As early discussed, it is also possible to have third support member 230 situated between portions of third edge surfaces 266 and 276 of top and bottom members 260 and 270, respectively, as seen in the figures. In fact, as seen in FIGS. 9 and 10, the monolithic structure is achievable without beamsplitter 130 touching both the top and bottom members. The stable monolithic structure is then achieved by having third support member 230 adhered as shown in the figures, and similarly to how member 210 is adhered. Accordingly, it is seen in FIGS. 9 and 10 that beamsplitter 130 can be adhered only along its bottom edges 138 to bottom member 270 (FIG. 9), or only along its top edges 137 to top member 260 (FIG. 10).

To complete the required reflecting elements of a Michelson interferometer, it is seen in the figures that a mirror panel 140 is bonded to a portion of top surface 278 of bottom member 270, and to a second edge surface 214 of support member 210. Mirror panel 140 is slightly over hanging top surface 278 of bottom member 270 by a portion of a bottom edge surface of mirror panel 140, and is bonded between these touching surfaces. Bonding also takes effect between the side edge surface of mirror panel 140 that touches edge surface 214 of support member 210. The bonding is accomplished through use of adhesive applied in a manner to avoid distorting the optically flat nature of the reflecting surface 142 of mirror panel 140.

Since minor panel 140 is fixedly adhered to assembly 200, as has just been discussed, there is no necessity for panel 140 to be other than a single, flat paneled mirror; for example, panel 140 does not need to be a retroreflector. One of the benefits of using a retroreflector (as has been discussed earlier regarding movable reflecting assembly 150) in a structure is that the orientation of the retroreflector is unimportant, as long as the incident radiation is at a 45 degree angle to the surfaces of the retroreflector. In the subject invention, the secured mounting of panel 140 to the monolithic structure assures that the orientation of panel 140 will not fluctuate due to vibration and shock, and therefore, a retroreflector is unnecessary (although a retroreflector could of course be utilized).

Figure 5:
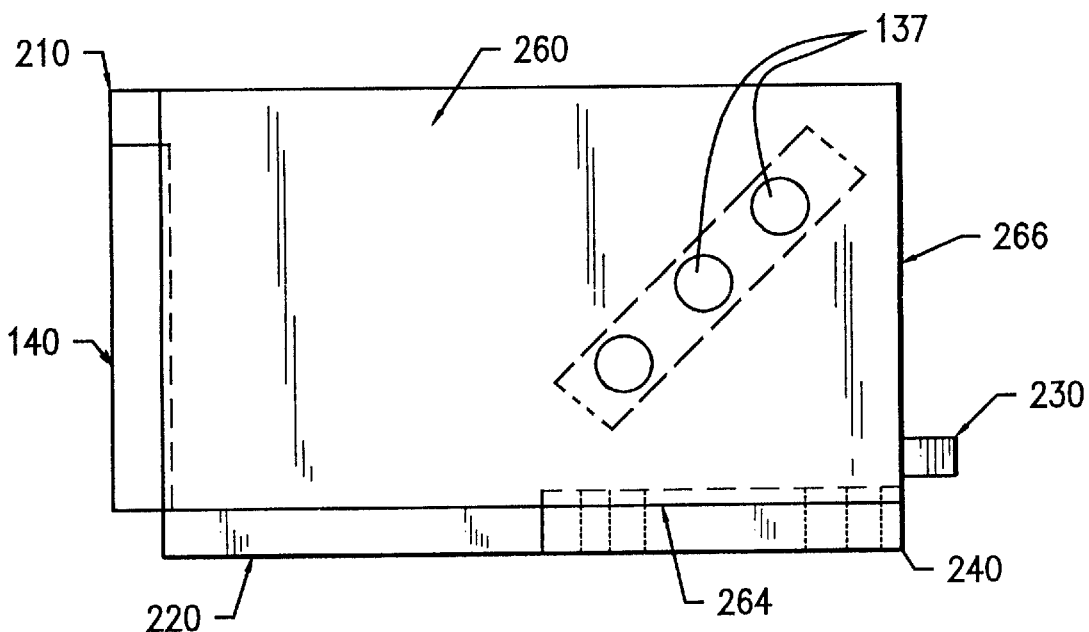
FIG. 5 is a top plan view of the monolithic optical assembly of the invention.
Figure 6:
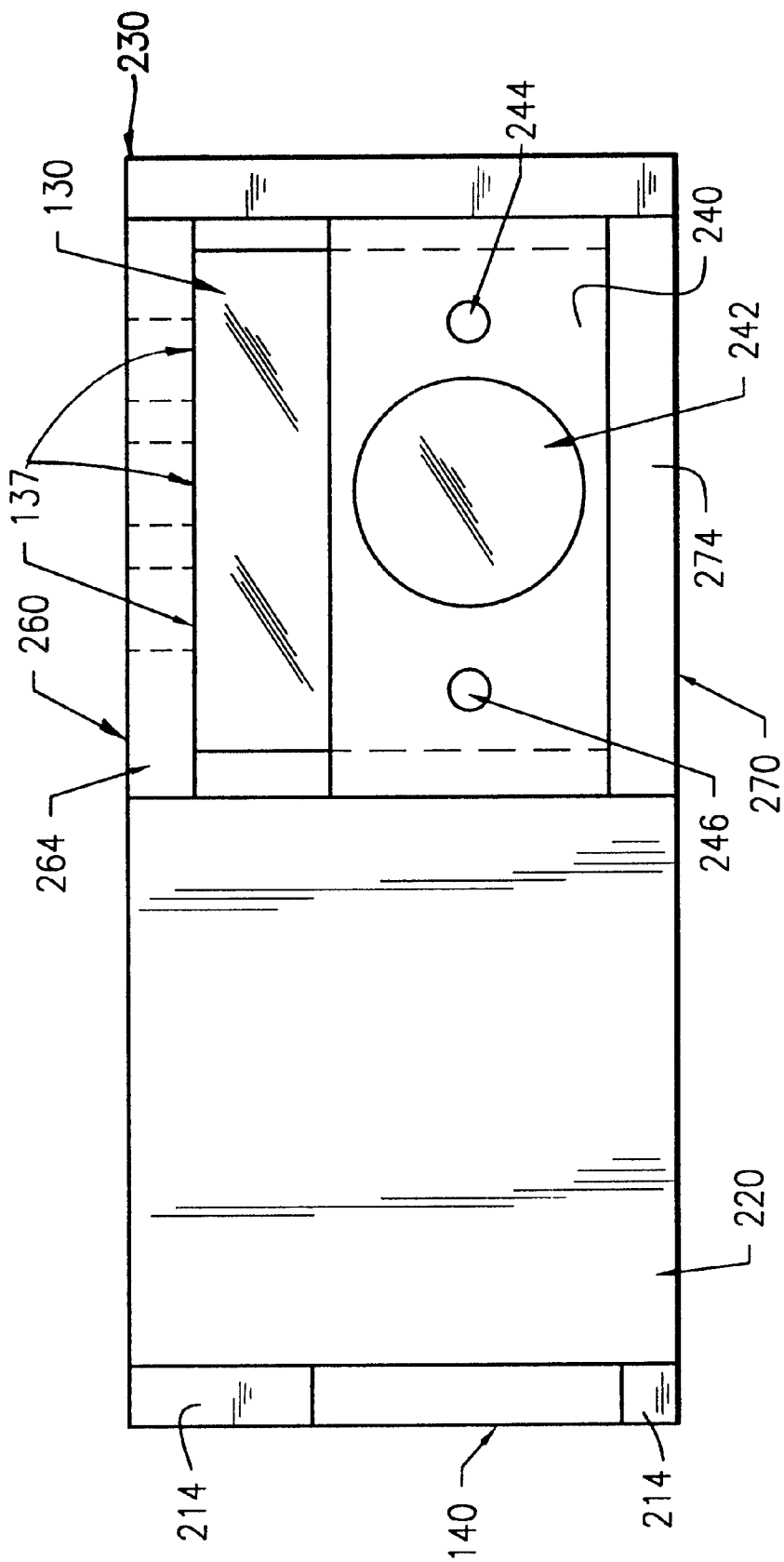
FIG. 6 is a side elevational view of one side of the monolithic optical assembly of the invention.

Assembly 200 can also have a fourth support member 240. While the main purpose of fourth support member 240 is not to help stabilize the monolithic structure of assembly 200, it is nevertheless called a support member herein. Instead, fourth support member 240 is positioned in relation to the path traveled by beam 120 so as to allow beam 120 to pass through opening 242 in member 240, to travel between beamsplitter 130 and movable reflecting assembly 150. Member 240 is mounted similarly to how mirror panel 140 is mounted, along a thin portion of an edge thereof onto a portion of top surface 278 of bottom member 270 (as best seen in FIG. 5), and along a side edge thereof which abuts and is bonded to an edge of support member 220 (also as best seen in FIG. 5).

All of the members, 210, 220, 230, 240, 260, 270, 130, and 140, of assembly 200, are made of the same material. The material preferably being either fused quartz or annealed Pyrex. The use of such materials allows the coefficients of expansion of the materials to be identical, so that any temperature changes experienced by assembly 200 is experienced equally throughout each member to allow assembly 200 to expand and contract uniformly, thereby removing the possibility of distortions in the reflecting surfaces of beamsplitter 130 and mirror panel 140.

Turning now to a discussion of FIG. 7, as has been earlier discussed, openings 244 and 246 in fourth support member 240 are used with a HeNe single source laser light. The light, or radiation, is seen at 310, emanating from a light source (not shown). Light 310 passes through beamsplitter 130 with part of the light beam 320 being reflected to mirror panel 140, and another part of the light 330 being translated through beamsplitter 130, through opening 246, so as to reflect off of retroreflector 152 of movable reflecting assembly 150.

Within number 240, and more particularly within opening 244, there is a small retroreflector 300.

Retroreflector 300 is made in accordance with standard retroreflectors as earlier recited from U.S. Pat. No. 3,663,084, and may be mounted within opening tube 44 as described in U.S. Pat. No. 3,977,765, to Lipkins. Beam 330 is then reflected back to reflecting assembly 150 and out through opening 246 back through beamsplitter 130 and to a detector.

Figure 8:
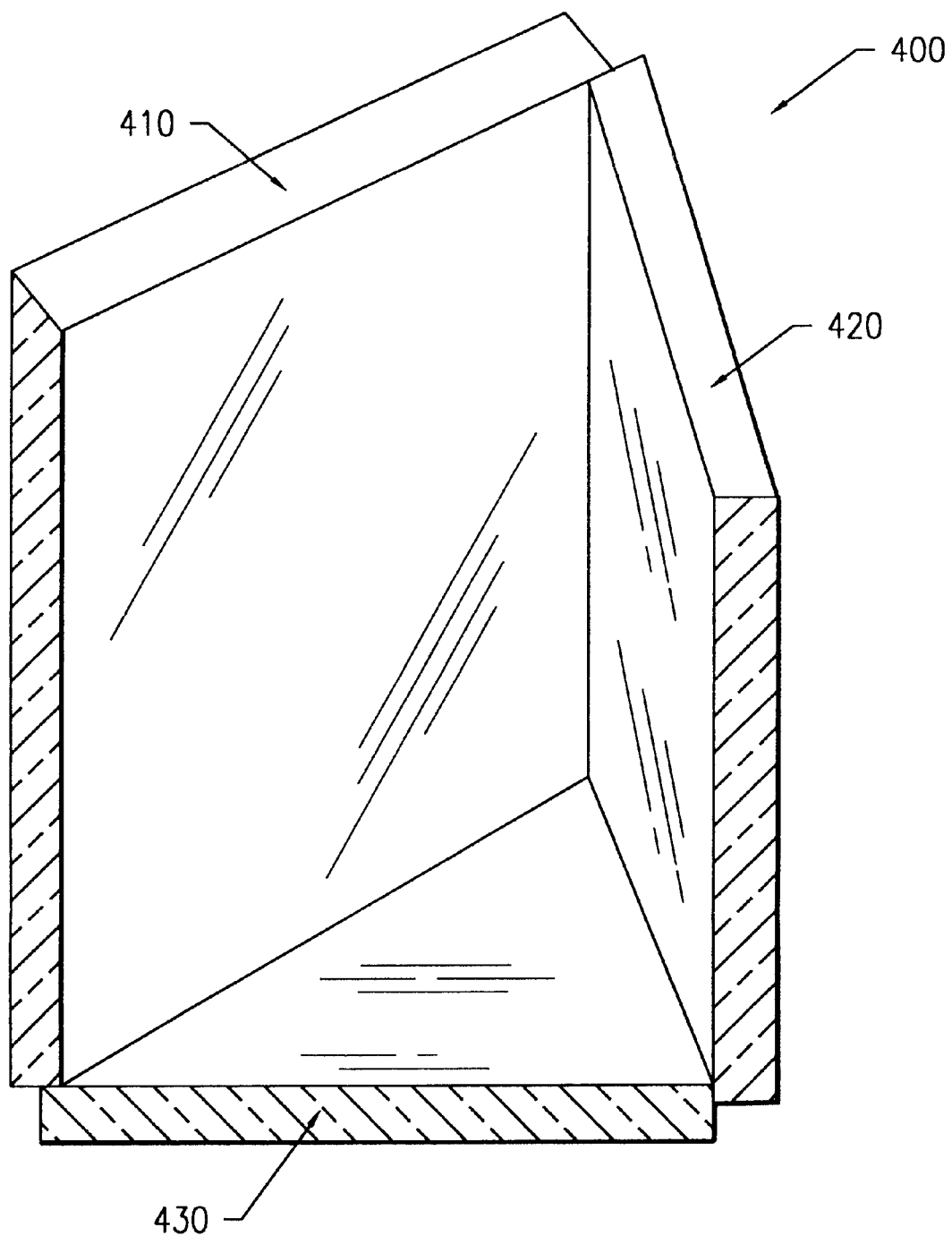
FIG. 8 is a perspective view of a third embodiment of the invention showing the monolithic optical assembly as a retroreflector/beamsplitter combination.

Turning now to a discussion of FIG. 8, a third embodiment of the monolithic structure for the optical assembly of the invention is disclosed at 400. Assembly 400 is in its most fundamental form, a hollow, corner-cube retroreflector as been discussed earlier in this disclosure, and as has been mentioned from U.S. Pat. No. 3,663,084 to Lipkins.

The difference between the disclosure of FIG. 8 and these prior art retroreflectors is that one of the mirror panels of the retroreflector is, in fact, a beam splitter panel 410, which by definition is at a 45 degree angle to the other mirror panel 420 of assembly 400.

Third panel 430 is not a reflecting panel, but is merely a support panel for completion of the retroreflector structure. Such a structure, as has been described in the prior art, utilizes the overlapping alternating adhesions between an edge of one panel to the reflective surface of an adjacent panel, etc.

In effect, one could substitute the monolithic retroreflector structure of FIG. 8 for the entire structure of assembly 200

(previously discussed), to achieve substantially the same results, and accordingly, the disclosure of FIG. 8 is properly described as an alternate embodiment of the structures of FIGS. 2–7 in the application.

Turning now to a discussion of FIGS. 11–14, an interferometer 500 is shown. Interferometer 500 incorporates therein a fourth embodiment of the monolithic structure of the invention at 505. Monolithic structure 505 comprises a beamsplitter assembly 530, first and third reflecting assemblies 540 and 560, respectively, first, second and third support members 570, 580 and 590, respectively, top and bottom members 620 and 640, respectively, and beamsplitter mount 600.

Figure 13:
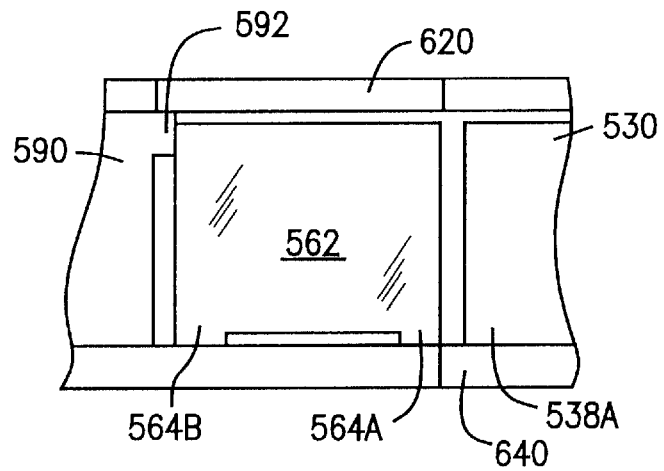
FIG. 13 is a partial side elevational view of another side of the fourth embodiment of the invention.
Figure 14:
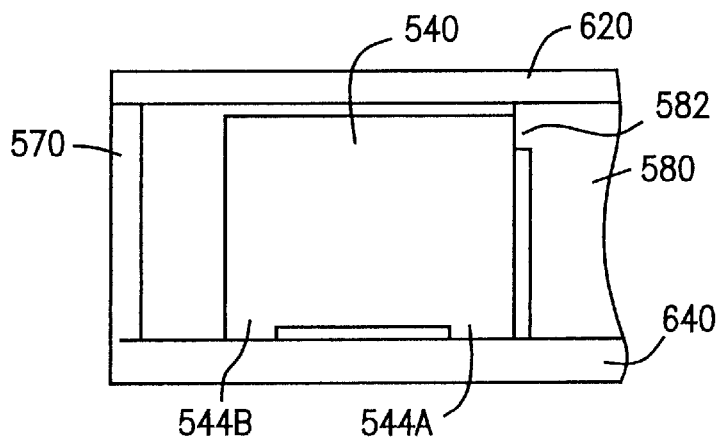
FIG. 14 is a partial side elevational view of yet another side of the fourth embodiment of the invention.

As is shown in FIGS. 13 and 14, support members 570, 580 and 590 are all located between top and bottom members 620 and 640. To achieve a unitary, monolithic construction of monolithic structure 505, support members 570, 580 and 590 are bonded along their top and bottom edges to portions of top and bottom members 620 and 640. The manner of bonding the support members between the top and bottom members is known in the art as Frit bonding.

Figure 11:
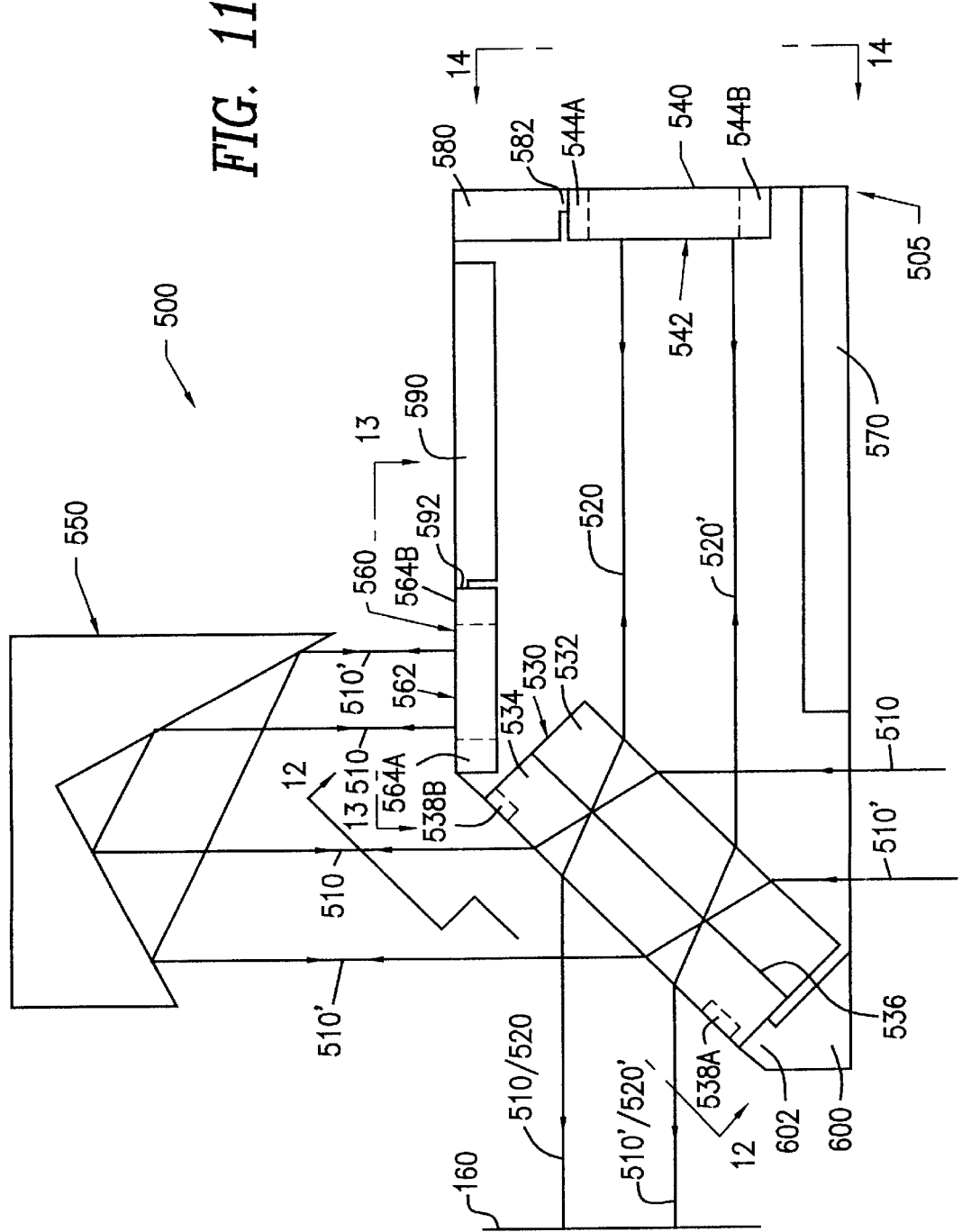
FIG. 11 is a cross-sectional top plan view of a fourth embodiment of the invention showing the third reflecting assembly in reflecting relation with the beamsplitter assembly.

Support member 580 has a mounting pad 582, while support member 590 has a mounting pad 592. As is shown in FIGS. 11, 13 and 14, these mounting pads are used as the third mounting point for reflecting assemblies 540 and 560, respectively. In particular, reflecting assembly 540 has mounting pads 544A and 544B, upon which it is bonded to an upper surface area of bottom member 640. Likewise, reflecting assembly 560 has mounting pads 564A and 564B, upon which it is bonded to a different upper surface area of bottom member 640. To complete the standard three point mounting of reflecting assemblies 540 and 560, so as to achieve kinematic construction thereof, reflecting assemblies 540 and 560 are also bonded to monolithic structure 505, at mounting pads 582 and 592, respectively.

In particular, bonding material (adhesive) is sparingly applied only between mounting pads 544A, 544B, 564A and 564B, and their respective contacting surfaces of bottom member 640, and between mounting pads 582 and 592 of support members 580 and 590, respectively, and an edge surface of reflecting assemblies 540 and 560, respectively. Such a kinematic assembly provides an extremely rigid yet light weight and sturdy structure. In addition, this construction allows for an extremely high degree of accuracy in the initial alignment of the reflecting surfaces of the reflecting assemblies, and maintained alignment accuracy when the structure is subject to vibration and extremes in temperature. Further, such a limited three point mounting structure reduces to a bare minimum any distortional effects the bonding might otherwise have on the planarity of the reflecting surfaces, even due to temperature changes in the device.

Figure 12:
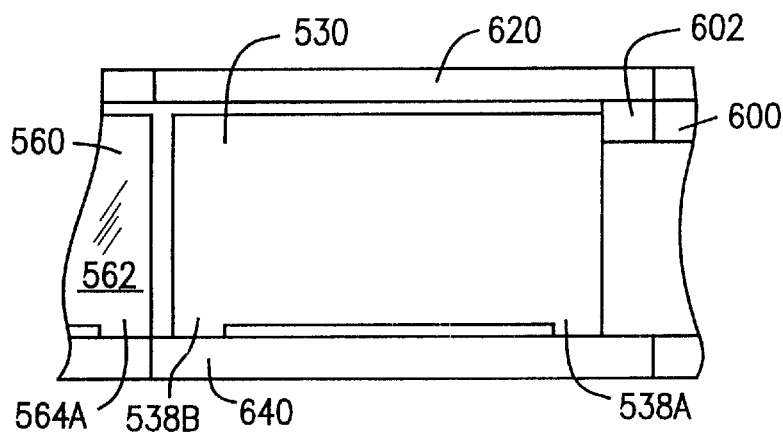
FIG. 12 is a partial side elevational view of one side of the fourth embodiment of the invention.

Beamsplitter assembly 530 is also mounted in such a kinematic manner. In particular, as is shown in FIGS. 11 and 12, beamsplitter assembly 530 has mounting pads 538A and 538B, upon which they are bonded to yet another top surface area of bottom member 640. Beamsplitter assembly 530 is also bonded to monolithic structure 505 at mounting pad 602 of beamsplitter mount 600, to complete the kinematic construction of the beamsplitter assembly to monolithic optical assembly 505.

As with the discussion of embodiments one and two hereof (FIGS. 1–7), beamsplitter coating 536 found on member 534, and between members 534 and 532 of beamsplitter assembly 530, is at a 45° angle to reflecting surface 542 of reflecting assembly 540. In addition, reflecting surface 542 is perpendicular to reflecting surface 562 of reflecting assembly 560. Accordingly, and as thereby follows, reflecting surface 562 is at a 45° angle to beamsplitter coating 536.

Based upon the above construction of monolithic assembly 505, when assembly 505 is placed into an interferometer 500 the result is that any collimated light source could be used to achieve a "fringe" effect in a Fourier transform spectrometer. This breakthrough outcome is the result of adding reflecting assembly 560 into the monolithic structure 505.

Reviewing how such a tantalizing result would be achieved, we first must understand why such a result was not achievable with past interferometers, including the monolithic structures of FIGS. 1–6 of this application's parent application Ser. No. 08/967,624; i.e., why only single wavelength light sources were useful in prior interferometers to achieve a "fringe" effect in a Fourier transform spectrometer.

The prior art interferometers known to applicants can only incorporate use of collimated white light for general interferometer applications, such as distance measurement, and/or a single wavelength light source to achieve a fringe effect in a spectrometer because of the manner in which they are constructed. In particular, and as has been discussed earlier in this application, it is only through the monolithic structure of the subject invention that alignment of all of the multiple components of an interferometer is achieved. Specifically, and looking at FIG. 11, it is customary in the interferometer field to use a retroreflector assembly (as is indicated at 550), instead of a flat mirror, for the movable reflecting assembly, although some still use a flat mirror assembly, thereby requiring a cumbersome translation unit to allow for the movement of the reflecting assembly. Use of a retroreflector allows for much larger tolerances in the placement and retained alignment of the reflecting assembly with respect to the beamsplitter of the assembly due to the manner of the retroreflector's construction.

In contrast, a flat mirror used in place of a retroreflector would require a very high degree of alignment accuracy, in both the initial setup and during operation of the interferometer, for the device to function within appropriate tolerances. Such tolerances accordingly require that the user of a movable flat mirror assembly use a cumbersome translation unit. If such a translation unit were not used, the required accuracy would be just short of impossible to achieve using a flat movable mirror. Accordingly, it has become almost standard in the interferometer field to use a retroreflector as the movable mirror in an interferometer setup.

The problem, therefore, in using a broadband light source in an interferometer to achieve a fringe effect in spectrometry, is that in order to work, the light from the source must reflect back upon itself after leaving the movable mirror (movable mirror indicated as 550 in the subject application). Since a substantial portion of the industry has reverted to the use of retroreflectors as the movable mirror, so as to essentially eliminate the need to align, and thereafter maintain alignment of the retroreflector, and since such a construction (see FIGS. 1–6) means that the light beam after traveling from the source, through the beamsplitter and then reflecting off of the retroreflector, travels back through the beamsplitter on a path different from the one it first took through the beamsplitter, the use of a multiple wavelength light source is not possible; i.e., the light does not reflect back upon itself, for spectrometry.

The subject invention of FIGS. 11–14 (and FIG. 15, to be discussed in more detail below), overcome both problems of the prior art: (1) using retroreflectors as the movable mirror; or (2) using a flat mirror as the movable mirror. In the subject invention, newly added third reflecting assembly 560 allows a retroreflector to be used as the movable reflecting assembly, while additionally acting as the "flat mirror" discussed above, and needed to allow for reflection back upon themselves of all light beams.

Insertion of third reflecting assembly 560 causes the otherwise displaced (although perfectly aligned) beams coming off of the retroreflector, to be re-directed back upon themselves, thereby allowing for the use of broadband light sources. Further, since third reflecting assembly 560 is part of the monolithic structure of monolithic optical assembly 505, it is provided with a fixed relational alignment with beamsplitter coating 536 and reflecting surface 542. As has been previously discussed in this and parent application Ser. No. 08/967,624, the prior art interferometers were composed of multiple, separate parts, any of which could be easily knocked out of alignment with respect to any and/or all of the other numerous parts. Accordingly, by placing third reflecting assembly 560 into monolithic optical assembly 505, one is assured of the stability and continued accuracy of the assembly.

Figure 15:
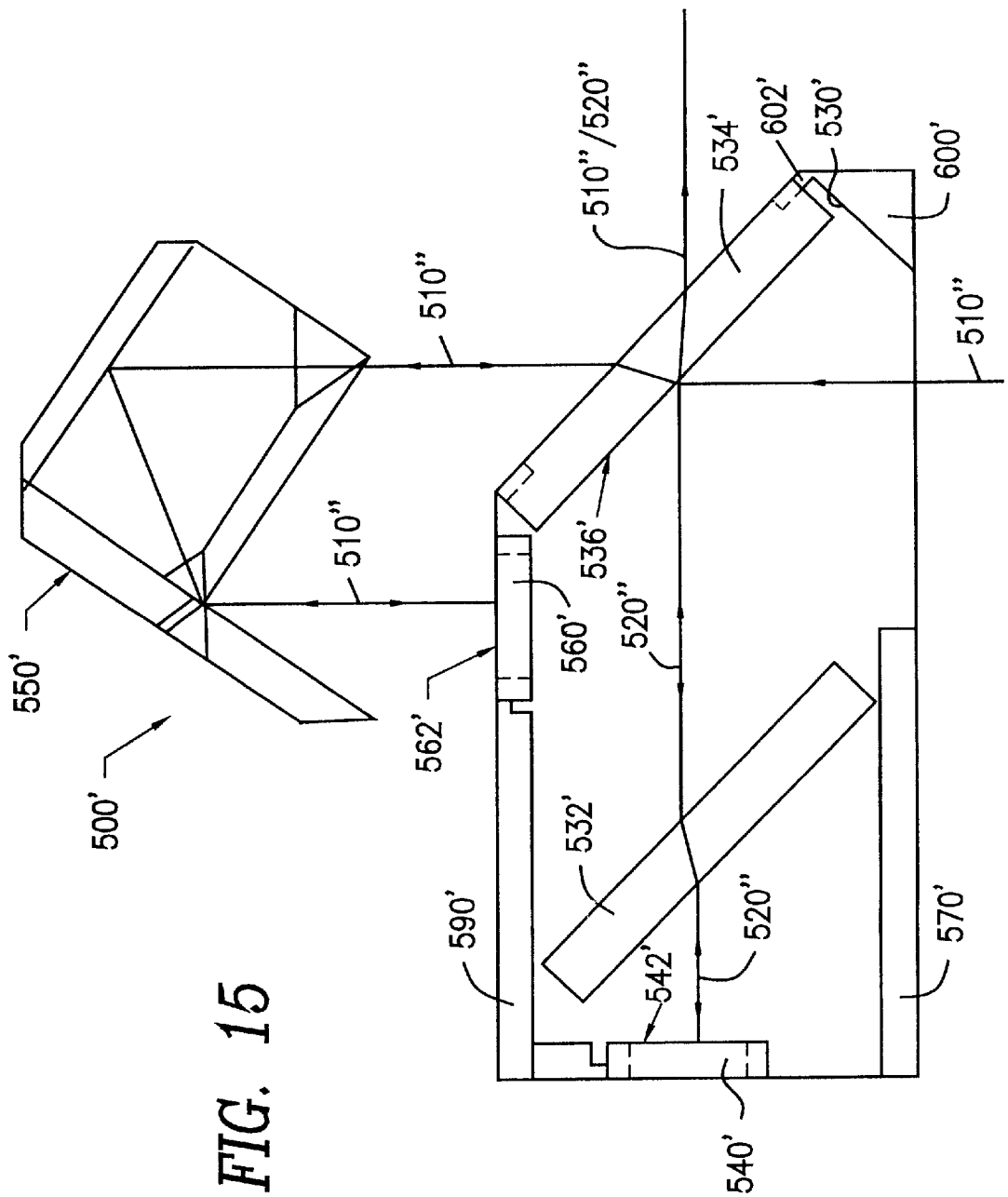
FIG. 15 is a cross-sectional top plan view of a fifth embodiment of the invention showing the beamsplitter assembly split into a beamsplitter and a compensator member.

Turning now to a discussion of the embodiment of FIG. 15, the only difference between this embodiment and the one of FIG. 11, is that the FIG. 15 embodiment splits beamsplitter 530 into a spaced apart beamsplitter 530' and a compensating panel 532'. While it is true that beamsplitter assembly 530 also has compensating panel 532 (as was earlier discussed herein regarding the earlier embodiments), the embodiment of FIG. 11 shows the compensating panel 532 directly in contact with beamsplitter coating 536. By placing compensating panel 532 of FIG. 11 in contact with beamsplitter coating 536, each light beam entering monolithic optical assembly 505 from the light source (not shown), was forced to translate four (4) times through the glass of panels 532 and 534. By separating the two components into beamsplitter 530' and compensating panel 532' of FIG. 15, applicants have reduced the number of translation paths from four to three.

Looking first at FIG. 11, one sees that the path beam 510 travels first translates through panel 532 until it hits coating 536. At coating 536, beam 510 divides; one part 510 continuing through coating 536 and panel 534 (second translation) to retroreflector 550, and the other part, beam 520, translating again through panel 532 (second translation) toward reflecting surface 542 of reflecting assembly 540.

Continuing to follow these now separate beam paths, the 510 beam (after reflecting off of retroreflector 550, third reflecting assembly 560 and again off of retroreflector 550), enters panel 534 along the same path it originally had when leaving panel 534 en route to retroreflector 550, it then translates again (third translation) through panel 534, reflects again off of coating 536 and back through panel 534 (fourth translation), to detector 160. Similarly, beam 520 reflects off of reflecting surface 542 back toward panel 532. At panel 532, beam 520 once again translates therethrough (third translation), through coating 536 and through panel 534 (forth translation), toward detector 160. Accordingly, it is seen that each path of any beam entering monolithic optical assembly 505 of FIG. 11, will need to translate four separate times through an intervening panel.

The improvement of the embodiment shown in FIG. 15 over that of the one just described and shown in FIG. 11, is that by separating panels 532 and 534, one whole translation is removed from the beam path. The light beam being required to translate through less panels is advantageous since (1) the beam retains more of its energy, (2) internal reflections through the panels are reduced, and (3) internal aberrations are also reduced. In all other aspects, the embodiment of FIG. 15 is identical to that of the FIG. 11 embodiment.

As with the earlier embodiments, all members of assembly 505 are made of the same material; preferably fused quartz or annealed Pyrex.

It will thus be seen that the objects set forth above, among those made apparent from the proceeding description, are efficiently obtained, and, since certain changes may be made in the above constructions without the party from the sphere and scope of the invention, it is intended that all matter contained in the above description as shown in the accompanying drawing shall be interpreted as illustrative and not in a limiting sense.

It is also to be understood that the following claims are intended to cover all of the generic and specific features of the invention herein described and all statements of the scope of the invention, which, as a matter of language, might be said to fall there between.

What is claimed is:

1. A monolithic optical assembly for use with an interferometer, comprising:
   a top member;
   a bottom member;
   a first support member bonded to a first portion of said top member and to a first portion of said bottom member;
   a second support member bonded to a second portion of said top member and to a second portion of said bottom member;
   a first mirror assembly having at least one reflecting surface, wherein said first mirror assembly is bonded either to said first support member and said top member or said bottom member, or to said second support member and said top member or said bottom member; and
   a beamsplitter assembly having a surface having a beamsplitter coating, said surface being in reflecting relation with said first mirror assembly, wherein said beamsplitter assembly is bonded to a third portion of said top member and to a third portion of said bottom member;
   wherein said bonding of said first and second support members and said beamsplitter assembly to said top and bottom members creates a substantially stable, substantially vibration and shock resistant structure regarding said reflective relationship between said first mirror assembly and said beamsplitter assembly.

2. A monolithic optical assembly as recited in claim 1, comprising a third support member bonded to said second support member and to a fourth portion of said bottom member, and extending across an optical path of a radiation beam transmitted through said beamsplitter assembly.

3. An interferometer assembly, comprising:
   a radiation source;
   a first mirror assembly having at least one reflecting surface;
   a monolithic reflecting structure having at least two reflecting surfaces in reflecting relation with said first mirror assembly, said monolithic reflecting structure, comprising:
   a top member;
   a bottom member;
   a first support member bonded to a first portion of said top member and to a first portion of said bottom member;

a second support member bonded to a second portion of said top member and to a second portion of said bottom member;

a second mirror assembly having at least one reflecting surface, wherein said second mirror assembly is bonded either to said first support member and said top member or said bottom member, or to said second support member and said top member or said bottom member;

a beamsplitter assembly having a surface having a beamsplitter coating, said surface being in reflecting relation with said first and second mirror assemblies, wherein said beamsplitter assembly is bonded to a third portion of said top member and to a third portion of said bottom member;

wherein said bonding of said first and second support members and said beamsplitter assembly to said top and bottom members creates a substantially stable, substantially vibration and shock resistant structure regarding said reflective relationship between said second mirror assembly and said beamsplitter assembly; and a radiation detector for detecting differences in the intensity variation of said radiation reaching said detector from said radiation source after leaving said beamsplitter assembly and reflecting off of said first and second mirror assemblies.

4. A retroreflector assembly as recited in claim 3, said monolithic reflecting structure further comprising a third support member bonded to said second support member and to a fourth portion of said bottom member, and extending across an optical path of said radiation transmitted through said beamsplitter assembly.

5. A monolithic optical assembly for use with an interferometer, comprising:

a top member;

a bottom member;

a first support member bonded to a first portion of said top member and to a first portion of said bottom member;

a second support member bonded to a second portion of said top member and to a second portion of said bottom member;

a third support member bonded to a third portion of said top member and to a third portion of said bottom member;

a first mirror assembly having at least one reflecting surface, wherein said first mirror assembly is bonded either to said first support member and said top member or said bottom member, or to said second support member and said top member or said bottom member; and a beamsplitter assembly having a surface having a beamsplitter coating, said beamsplitter assembly bonded to either said top or bottom members of said monolithic optical assembly, so that said surface is in reflecting relation with said first mirror assembly;

wherein said bonding of said first, second and third support members to said top and bottom members creates a substantially stable, substantially vibration and shock resistant structure regarding said reflective relationship between said first mirror assembly and said beamsplitter assembly.

6. A monolithic optical assembly for use with an interferometer, comprising:

a top member;

a bottom member;

a first support member bonded to a first portion of said top member and to a first portion of said bottom member;

a second support member bonded to a second portion of said top member and to a second portion of said bottom member;

a third support member bonded to a third portion of said top member and to a third portion of said bottom member;

a first mirror assembly having at least one reflecting surface, wherein said first mirror assembly is bonded to said first support member and to a first portion of said bottom member;

a second mirror assembly having at least one reflecting surface in reflecting relation to said at least one reflecting surface of said first mirror assembly, said second mirror assembly being bonded to said second support member and to a second portion of said bottom member; and a beamsplitter assembly having a surface having a beamsplitter coating, said beamsplitter assembly bonded to said top member and to a third portion of said bottom member, so that said surface is in reflecting relation with said first and second mirror assemblies;

wherein said bonding of said first, second and third support members to said top and bottom members creates a substantially stable, substantially vibration and shock resistant structure regarding said reflective relationship between said first mirror assembly, said second mirror assembly and said beamsplitter assembly.

7. A monolithic optical assembly as recited in claim 6, wherein said at least one reflecting surface of said first mirror assembly is optically flat.

8. A monolithic optical assembly as recited in claim 6, wherein said at least one reflecting surface of said second mirror assembly is optically flat.

9. A monolithic optical assembly as recited in claim 6, wherein said surface of said beamsplitter assembly is optically flat.

10. A monolithic optical assembly as recited in claim 6, wherein said top and bottom members, said first, second and third support members, said first and second mirror assemblies and said beamsplitter assembly are made of material having substantially the same coefficient of thermal expansion.

11. A monolithic optical assembly as recited in claim 6, wherein said surface of said beamsplitter assembly lies in a plane which is aligned at a substantially 45° angle to second and third planes in which said at least one reflecting surfaces of said first and second mirror assemblies lie.

12. A monolithic optical assembly as recited in claim 11, wherein said second and third planes are substantially perpendicular to eachother.

13. A monolithic optical assembly as recited in claim 11, wherein said beamsplitter assembly comprises first and second panels, said first panel having a first surface and said second panel having a second surface, with said panels being joined together along said first and second surfaces.

14. A monolithic optical assembly as recited in claim 13, wherein said beamsplitter coating is located between said bonded together first and second panels of said beamsplitter assembly.

15. A monolithic optical assembly as recited in claim 11, said monolithic optical assembly further comprising a compensating panel bonded to a fifth portion of said bottom member and located between said first reflecting assembly and said beamsplitter assembly.

16. A monolithic optical assembly as recited in claim 15, wherein said surface of said beamsplitter assembly having said beamsplitter coating, faces said compensating panel.

17. An interferometer assembly, comprising:

a radiation source;

a first mirror assembly having at least one reflecting surface;

a monolithic reflecting structure having at least two reflecting surfaces in reflecting relation with said first mirror assembly, said monolithic reflecting structure, comprising:
a top member;
a bottom member;
a first support member bonded to a first portion of said top member and to a first portion of said bottom member;
a second support member bonded to a second portion of said top member and to a second portion of said bottom member;
a third support member bonded to a third portion of said top member and to a third portion of said bottom member;
a first mirror assembly having at least one reflecting surface, wherein said first mirror assembly is bonded to said first support member and to a first portion of said bottom member;

a second mirror assembly having at least one reflecting surface in reflecting relation to said at least one reflecting surface of said first mirror assembly, said second mirror assembly being bonded to said second support member and to a second portion of said bottom member; and a beamsplitter assembly having a surface having a beamsplitter coating, said beamsplitter assembly bonded to said top member and to a third portion of said bottom member, so that said surface is in reflecting relation with said first and second mirror assemblies;

wherein said bonding of said first, second and third support members to said top and bottom members creates a substantially stable, substantially vibration and shock resistant structure regarding said reflective relationship between said first mirror assembly, said second mirror assembly and said beamsplitter assembly; and a radiation detector for detecting differences in the intensity variation of said radiation reaching said detector from said radiation source after leaving said beamsplitter assembly and reflecting off of said first and second mirror assemblies.

* * * * *